United States Patent [19]

Matousek et al.

[11] Patent Number: 5,895,319
[45] Date of Patent: Apr. 20, 1999

[54] AIR INTAKE SYSTEM FOR AN OFF-HIGHWAY MACHINE

[75] Inventors: Robert A. Matousek, Milan, Ill.; Randolf A. Warnke, West Liberty, Iowa

[73] Assignee: Case Corporation, Racine, Wis.

[21] Appl. No.: 08/769,891

[22] Filed: Dec. 19, 1996

[51] Int. Cl.⁶ .............................. A01F 12/00; A01F 12/48
[52] U.S. Cl. ........................... 460/100; 460/117; 454/84
[58] Field of Search ..................... 460/100, 99, 117, 460/119, 150; 56/12.8, DIG. 8; 454/84, 137

[56] References Cited

U.S. PATENT DOCUMENTS

| | | |
|---|---|---|
| 3,237,386 | 3/1966 | Farr et al. . |
| 3,378,994 | 4/1968 | Farr . |
| 3,664,349 | 5/1972 | Quick ............................................. 460/99 |
| 4,469,490 | 9/1984 | Wilson . |
| 4,934,449 | 6/1990 | Watt et al. . |
| 5,248,278 | 9/1993 | Fuerst et al. .......................... 454/137 X |
| 5,277,157 | 1/1994 | Teich . |
| 5,427,502 | 6/1995 | Hudson . |

*Primary Examiner*—Terry Lee Melius
*Attorney, Agent, or Firm*—Mayer, Brown & Platt

[57] ABSTRACT

An off-highway machine such as an agriculture harvester has an enclosed cab and a pressurizing blower or fan assembly for developing a primary or rapidly moving flow of air theretoward and directing a pressurized stream of a away therefrom. An apparatus is arranged proximate to and in operable combination with the blower or fan assembly on the off-highway machine for providing precleaned air to the enclosure.

36 Claims, 4 Drawing Sheets

AIR INTAKE SYSTEM FOR AN OFF-HIGHWAY MACHINE

FIELD OF THE INVENTION

The present invention generally relates to off-highway machines and, more particularly, to an air intake system for an off-highway machine such as an agricultural harvester.

BACKGROUND OF THE INVENTION

Off-highway machines typically operate in areas having a relatively high concentration of dirt, dust and other debris in the surrounding atmospheric or ambient air. As an agricultural combine moves through a field, the normal operation of separating grain from material other than grain further complicates the air contamination problem in and about the entire machine.

Concern for operator comfort has led to development of increasingly sophisticated operator enclosures or cab regions on such machines. Modern cab designs are ergonomically configured to offer a comfortable and relatively clean atmosphere for the operator regardless of the outside environment.

It is well known in agricultural combines to provide a completely enclosed cab which takes in and filters outside air, heats or cools the air as ruined through an atmosphere control system, and circulates it within the cab as by means of a fan or pressurizing blower. Preferably, the air within the cab is maintained at a pressure slightly higher than atmospheric, so as to discourage the entry of dust or other contaminants through, for example, imperfectly sealed doors or windows. Some off-highway machines are provided with air inlets arranged toward a roof line of the enclosure. From the air inlet, air is drawn downwardly through a hollow rollover protective structure and then to a filter assembly.

Filter of the air from the intake becomes a formidable task, especially on agricultural combines. With agricultural combines, the entire environment immediately surrounding the combine is often saturated with dust and chaff. This load of debris in the inlet air can very quickly inundate the typical filtering systems (paper element inline filters) if fed directly from the outside environment to the filter without first precleaning a major portion of the undesirable matter out of the flow.

Accordingly, some off-highway machines utilize a precleaner apparatus disposed between the air intake and the filter. Most current commercially available precleaning units are not capable of sufficiently scrubbing the air of dust at the very low air flow rates required for this application. Moreover, the extremely dirty a that this application is subjected to has proven to overwhelm these devices and cause premature failure of their function. Accordingly, when the precleaner fails, the filter becomes plugged with dust and the effective cab pressurization is lost as the fan mounted within the cab enclosure is starved for inlet air. This results in dirty environmental air entering the cab through the aforementioned imperfectly sealed doors or windows, thus reducing the efficiency of the heating and air conditioning system and leading to extreme operator discomfort.

The remedy for this problem is to temporarily discontinue harvesting operations and take the necessary steps to service the air intake system. This requires the harvesting operation to cease. Thereafter, the filter must be cleaned to remove the built up debris from the inlet filter element and/or precleaning apparatus. This lost time and extra effort leads to operator dissatisfaction with the machine, and a desire for an alternative system that would not fall in these circumstances. Moreover, having to repeatedly clean the air intake system quickly leads to added downtime, reduced harvesting capacity and, thus, lost profits.

Thus, there is a need and a desire for an a intake system for an off-highway machine wherein it is possible to provide a very low air flow of precleaned air to the cab station while offering prolonged or extended operating times for the off-highway machine.

SUMMARY OF THE INVENTION

In view of the above, and in accordance with the present invention, there is provided an off-highway machine having an enclosed cab and a pressurizing blower or fan assembly for developing a primary or rapidly moving flow of air theretoward and directing a pressurized stream of air away therefrom. A salient feature of the present invention concerns an apparatus arranged proximate to and in operable combination with the blower or fan assembly for providing precleaned air to the enclosure.

The apparatus for providing precleaned air to the enclosure advantageously has no moving pats associated therewith. That is, such apparatus includes an air plenum having an aspirator type inlet opening. The inlet of the air plenum is preferably arranged relative to and directly upstream of the blower or fan assembly and serves to allow a relatively small or secondary stream of air to bleed into a cavity defined by the air plenum. Moreover, the air plenum is of substantially coequal lengthwise measure with the blower or fan assembly. The air plenum preferably includes a smooth curvilinear surface configuration arranged relative to the fan assembly to establish a directed and relatively high velocity of air flow toward the inlet of the fan.

In its preferred form, the off-highway machine includes an atmosphere control system including a fan mounted within the interior of the cab enclosure for circulating air within the cab and maintaining a pressure slightly higher than atmospheric. During operation, the fan of the atmosphere control system draws air from a cavity of the air plenum toward the enclosure. In a most preferred form of the invention, a filter is disposed between the fan of the atmosphere control system and the air plenum for further cleaning the air passing therebetween.

The air intake system of the present invention is particularly suited for use in combination with an agricultural combine including a mobile frame having a cab enclosure mounted toward a forward end of the frame. The agricultural combine includes a grain separating section mounted on the frame and a grain cleaning section. The g cleaning section includes a sieve arranged in material receiving relation relative to the grain separating section and a fan assembly for directing an air stream from beneath and through the sieve for separating grain from material other than grain. According to the present invention, such an agricultural combine further includes an apparatus arranged proximate to and in operable combination with the fan assembly of the cleaning section of the combine for providing precleaned air to the cab enclosure.

The fan assembly of the cleaning section preferably includes a fan including a series of axially elongated blades concentrically arranged in a cylindrical pattern about a longitudinal axis of the fan, and a housing in which the fan is rotatable mounted. As mentioned above, the apparatus for precleaning the air includes an elongated plenum of substantially coequal length with that of the fan of the fan assembly. Preferably, the air plenum includes a front facing arcuate plate for directing a rapidly moving primary air stream to an inlet of the housing of the fan assembly. Moreover, the air plenum preferably defines an inlet of substantially coequal length and which is disposed, in the direction of air flow, closer to the inlet of the housing of the fan than is an outlet defied by the air plenum such that as the air approaches the inlet to the housing of the fan assembly debris in the air is inescapably entrained by the momentum of the air and its own mass and velocity is therefore predisposed to enter the fan assembly.

With the present invention, ambient air laden with dust and debris is attracted toward the cleaning fan. As the ambient air approaches the inlet to the fan assembly, the air is dramatically accelerated and follows a curvilinear flow pattern directed by the front face of the air plenum. In the area of the fan inlet, the stream of air reaches speeds in excess of 3000 FPM. As will be appreciated, the particulate matter in the primary air stream is likewise accelerated and likewise follows the path of flow described by the air flow and also at a very high speed. As mentioned, as the particulate matter approaches the intense inlet condition of the fan assembly, such dust, dirt, debris and other particulate matter is inescapably trapped by its own momentum caused by the mass and velocity thereof, and is therefore predisposed to enter the fan and be blown out the outlet end thereof.

A small portion of the air flowing toward the inlet of the fan assembly (perhaps 50 cfm out of the total 1500 cfm) is directed through the inlet of the air plenum into a hollow opening or cavity defied thereby. That is, a second relatively small stream of air is caused to abruptly turn at the bottom of the front face of the air plenum and pass through the inlet into the cavity of the air plenum. The abrupt change and near reversal of direction of the air passing into the inlet of the precleaner apparatus serves to preclude matter and debris with higher mass (momentum) from following this minor or secondary stream of air.

The fan of the atmosphere control system, mounted within the cab region of the off-highway machine, draws the air passing through the inlet upward into the plenum. Preferably, the walls of the plenum diverge as the air moves upwardly. Thus, the air drawn into the chamber or cavity of the air plenum will tend to lose velocity thereby giving the particles therein still another reason to exit the air and fall away due to gravitational attraction.

When the machine ceases operation, the air intake system of the present invention has a self cleaning effect. That is, upon cessation of a flow through the plenum, (coincident with machine shutdown) any material that has been drawn into the plenum gravitationally exits the inlet opening to the air plenum. When the machine is again started, the material passing outwardly from the cavity of the air plenum through the inlet is whisked away the next time the fan assembly is operated.

In view of the above, a primary object of the present invention is to provide an air intake system for an off-highway machine which is compact, convenient to assemble, service and repair and which is efficient in operation.

Advantageously, the air inlet system or intake system of the present invention has no moving parts and, thus, can be used for extended periods of time without servicing. Moreover, the volume of the precleaner apparatus is significantly greater than prior art devices and, thus, is capable of delivering more than adequate quantities of precleaned air to the cabin enclosure. Because precleaned air is being provided to the cab enclosure, operation of any filter assembly associated therewith is likewise prolonged.

These and other objects, aims and advantages of the present invention will become readily apparent from the following detailed description, the drawings and the appended clams.

DETAILED DESCRIPTION OF THE PRESENT INVENTION

Figure 1:
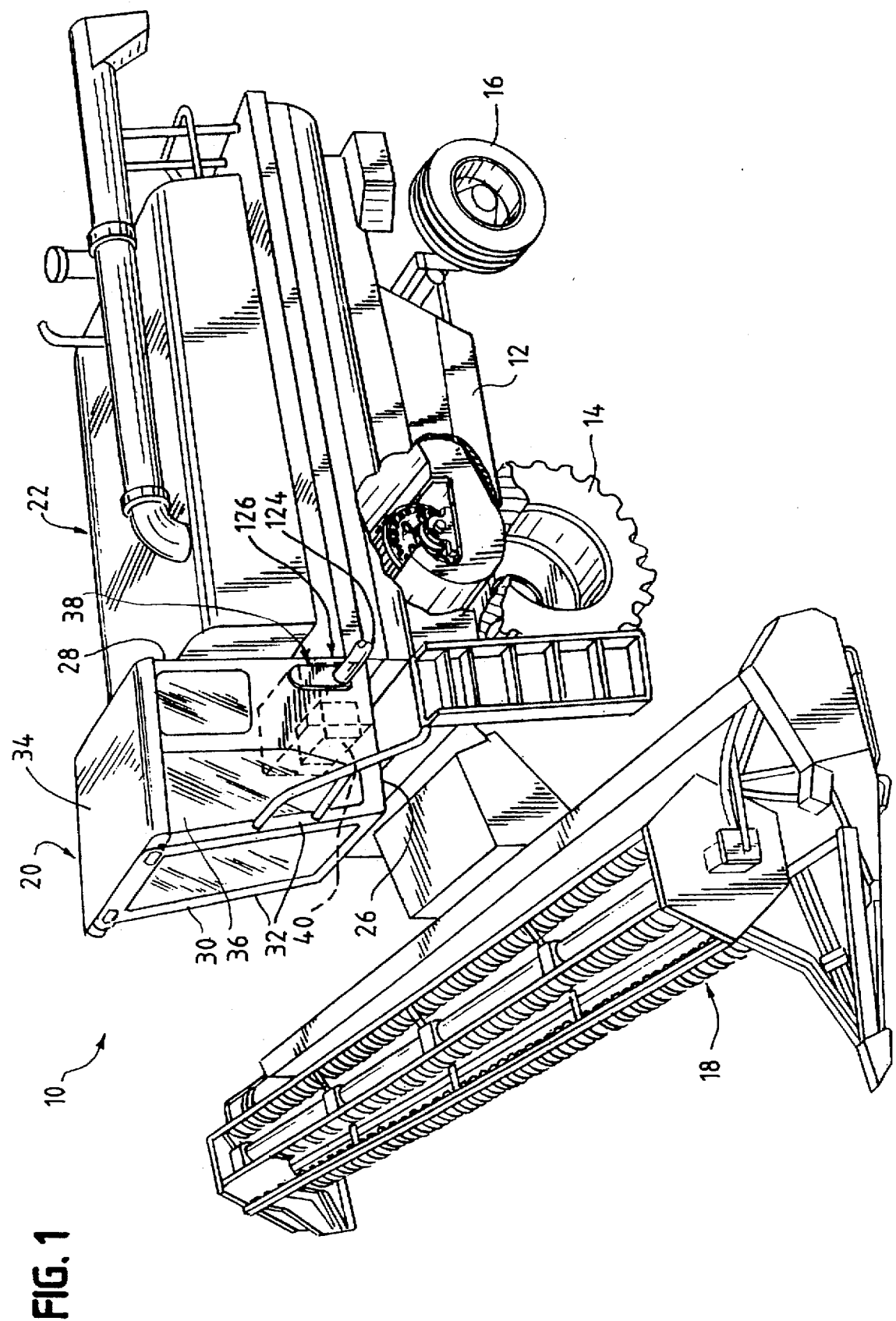
FIG. 1 illustrates a perspective view, partially broken away, of an off-highway machine such as an agricultural harvester.

While the present invention is susceptible of embodiment in various forms, there is shown in the drawings a presently preferred embodiment of the invention which is hereinafter described, with the understanding that the present disclosure is to be considered as an exemplification of the invention, which is not intended to limit the invention to the specific embodiment illustrated.

Referring now to the drawings, wherein like reference numerals refer to like parts throughout the several views, in FIG. 1 there is shown a self-propelled off-highway machine to which the present invention applies. For exemplary purposes, the off-highway machine 10 is shown as an agricultural harvester of the type sold by Case Corporation of Racine, Wis., under Model No. 2100. Suffice it to say, as the combine is driven through the field, and particularly as a result of its operation, ambient air in and about the combine 10 is laden with debris in the form of dirt, dust, chaff and a myriad of other contaminants. Moreover, and although a combine has been selected as one type of off-highway machine to which the present invention applies, it should be appreciated that the present invention is equally applicable to a myriad of other types of off-highway machines with minimum design changes being incorporated Into the invention.

As is well known in the art, combine 10 includes a mobile frame 12 which, in the illustrated embodiment is mounted on a pair of front drive wheels 14 and a pair of rear steerable wheels 16. Toward a front end thereof, a laterally elongated header assembly 18 is mounted to the frame 12 for reaping and gathering crop materials as the combine is driven across the field. As will be appreciated by those skilled in the art, during the harvesting operation the header assembly adds a significant amount of dust and other contaminating debris to the ambient air surrounding the harvester. To offer protection against such contaminants, a cab enclosure or operator station is mounted toward a front end of the frame 12 above the header assembly 18. A main body or walled enclosure 22 is also mounted on the frame 12 reward of the cabin closure. An internal combustion engine (not shown) is mounted within the walled enclosure 22.

The cab enclosure 20 is generally rectangular in shape and preferably includes a floor 26, a rear wall 28, a front window or wall 30, opposite side walls 32, and a roof 34. There is an access door 36 in one of the side walls 32. As is well known, the cab enclosure includes a seat (not shown), a steering column (not shown) and various controls and equipment for controlling operation of the harvester. A compact atmosphere control system 38 is also mounted within the enclosure 20 preferably on the floor 26 close to the rear wall 28. The control system 38 may be conventional in structure and, suffice it to say, includes a fan or pressurizing blower 40.

Figure 2:
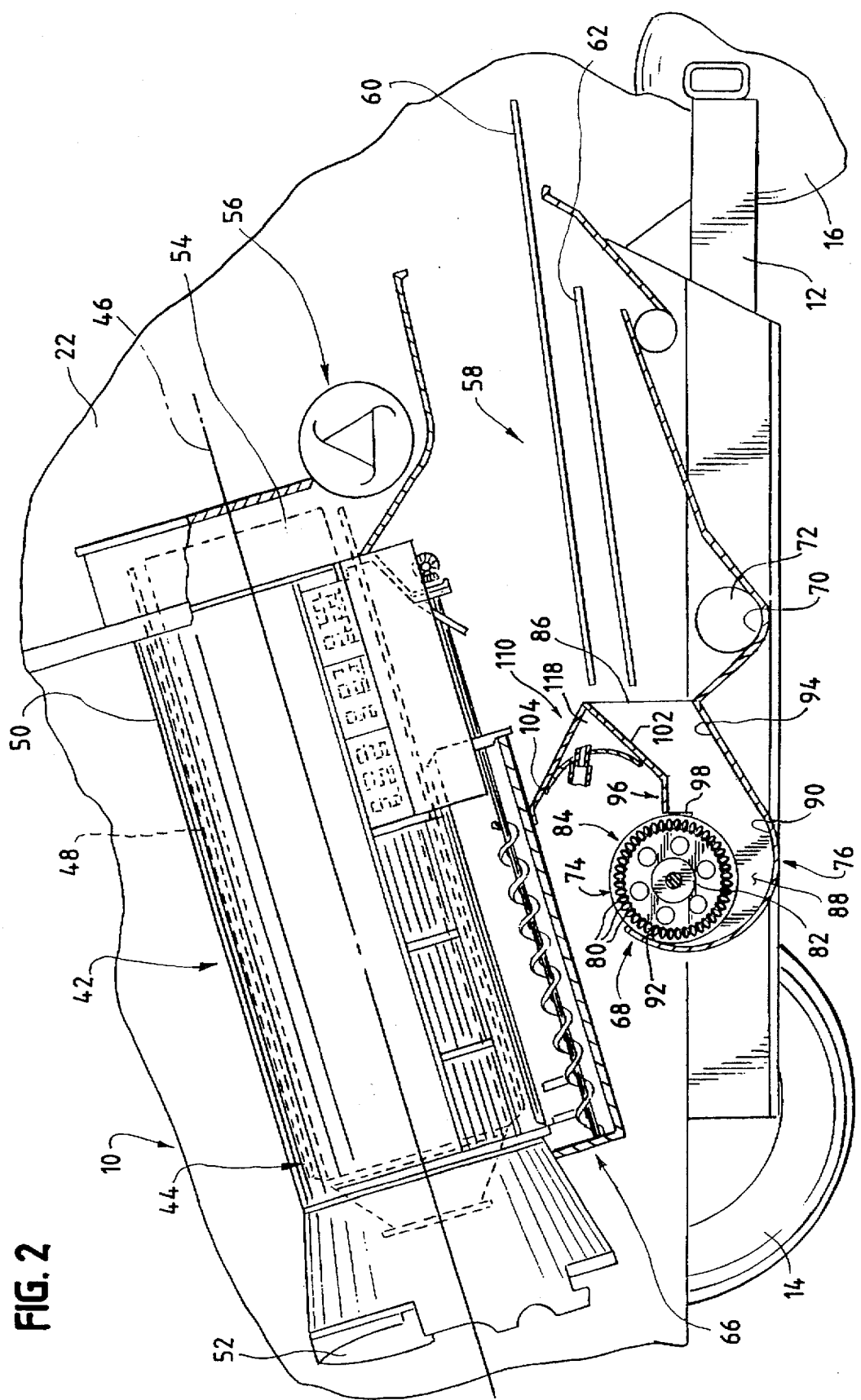
FIG. 2 is an enlarged cross sectional view showing a grain separating station and a grain cleaning station of the combine.

Turning to FIG. 2, as is conventional and well known, a grain separating station 42 is defined within the walled enclosure 22. In the illustrated form of the invention, the grain separating station 42 is defined by an axially elongated rotor assembly 44 mounted for rotation about a fixed axis 46. The rotor assembly 44 includes a suitably configured relatively large diameter rotor 48 mounted within a foraminous housing 50.

The rotor assembly 44 defines an inlet end 52 and an outlet end 54. Crop materials are introduced at the inlet end 52 of the rotor assembly 44 and are repeatedly and gently spiraled toward the outlet end 54 of the rotor assembly. Through the combined action of the rotor 48 and the housing 50, grain is separated from the majority of material other than grain. Material other than grain includes chaff, tailings and a myriad of forms of other debris. As will be appreciated by those skilled in the art, material which is too large to pass through the openings in the housing 50 rearwardly pass through the rotor assembly 44 toward and, ultimately, from the outlet end 54. A conventional beater 56 acts upon the material discharged from the rotor assembly 44. Suffice it to say, the beater 56 propels crop residue from the rear of the rotor assembly 44 and throws it back for discharge from the rear end of the combine. The ambient air in this particular area of the combine is heavily contaminated and laden with debris.

The combine 10 is further provided with a grain cleaning section 58. As shown in FIG. 2, the grain cleaning section 58 preferably includes sieves 60 and 62 which are mounted for oscillation to further separate grain from material other than grain. The oscillation of the sieves 60, 62 arranges the crop materials received from the grain separating station 42 in a relatively large crop mat or veil extending across substantially the entire sieve. In the embodiment shown, a pan and auger 66 serve to move grain from the grain separating station 42 toward the cleaning sieves 60 and 62 defining part of the cleaning area on the combine.

The grain cleaning section 58 of the combine further includes a fan assembly or blower assembly 68. Preferably, the fan assembly 68 is substantially similar to the fan assembly disclosed and claimed in copending and coassigned U.S. patent application Ser. No. 08/513,013 filed on Aug. 9, 1995; the full disclosure of which is incorporated herein by reference. During operation of the combine, the fan assembly 68 serves to upwardly direct a stream of air through the veil or mat of material on the sieves 60, 62 of the cleaning section or station 58. Lighter materials, entrapped in the upwardly directed air stream, are separated from heavier materials, and are blown out the rear end of the combine thereby adding to contamination of the ambient air. The heavier grain falls through the sieves 60, 62 to a clean grain collection area 70. An auger 72 directs the grain from the collection area 70 into a hopper (not shown) on the combine.

Figure 3:
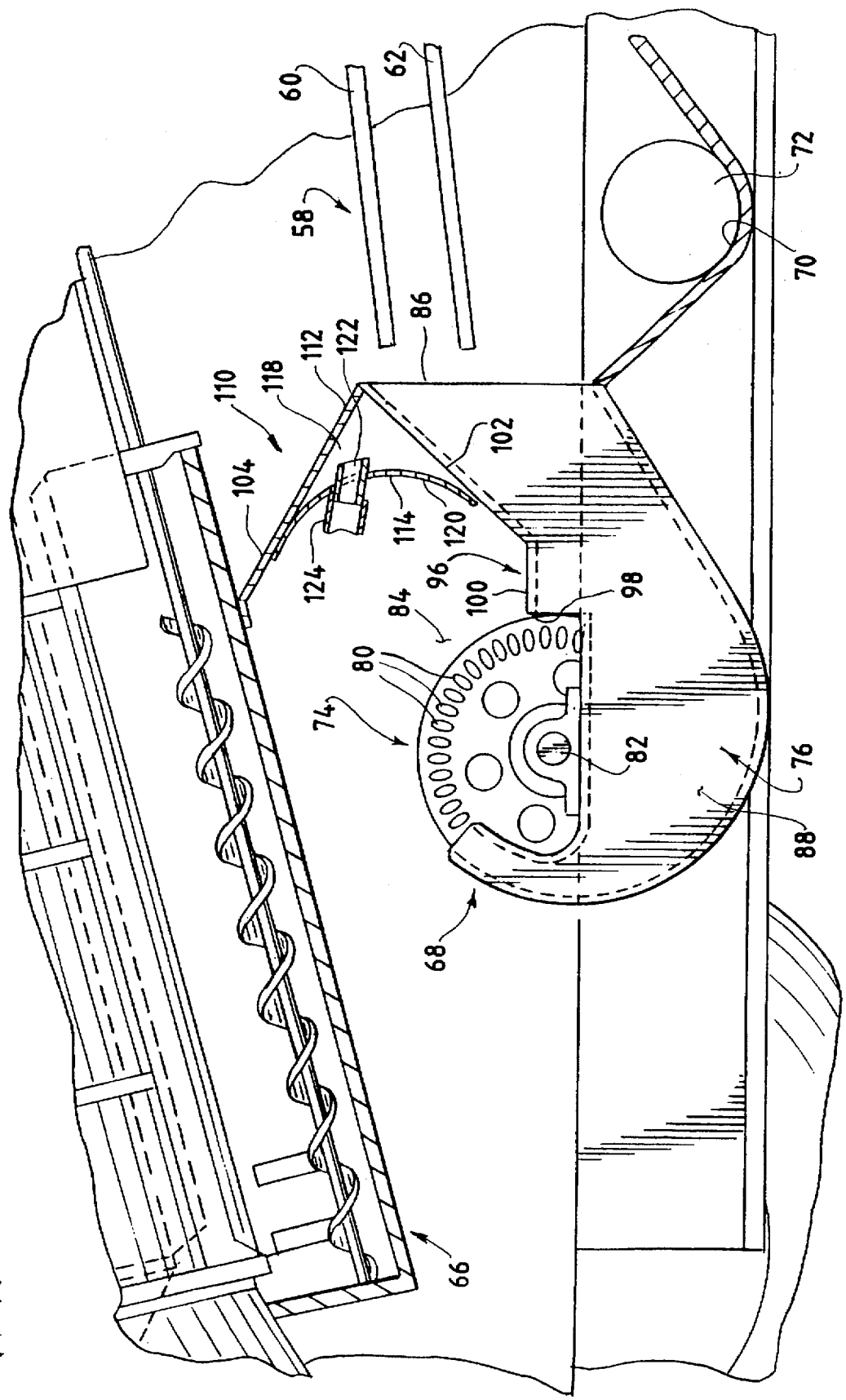
FIG. 3 is an enlarged fragmentary view of the cleaning station and showing an air plenum forming part of the present invention.

The fan assembly 68 comprises an elongated centrifugal or cross flow fan 74 and a housing 76. The fan 74 preferably extends transversely across substantially the entire width of the combine 10. More specifically, the centrifugal fan 74 is transversely mounted on the frame 12 beneath the g separating station 42 and preferably forward of the cleaning sieves 60, 62. As shown in FIGS. 2 and 3, fan 74 includes a series or plurality of closely spaced fan blades 80 extending axially in a circumferential array or pattern about the longitudinal axis 82 of the fan to define an open center for the fan. The fan 74 is driven through a variable speed fan drive (not shown) that includes, as part thereof, a driven pulley mounted toward one end of the fan assembly.

Housing 76 of fan assembly 68 extends parallel to and along substantially the entire length of the fan 74. The housing 76 is preferably fabricated from an air impervious material such as steel or the like and defines an elongated air inlet opening 84 and an elongated air outlet opening 86 for directing air discharged therefrom toward the cleaning sieves 60, 62. The housing 76 further defines an internal chamber 88, wherein the fan 74 is rotatably mounted to drive air between the air inlet and air outlet openings 84 and 86, respectively.

As shown in FIGS. 2 and 3, the air inlet opening 84 of housing 76 is relatively large in that it opens to about 35% to about 45% of periphery of fan 74. As shown, the air inlet opening 84 defined by housing 76 extends across a top side of the fan 74 and opens to a rearward portion of the fan 74. Advantageously, housing 76 wraps about and extends across the front end of the fan 74 to protect the fan blades 80 from being damaged by rocks and other debris that are present in the field as the combine moves thereover. In the embodiment illustrated, opposite ends of the housing 76 are open.

The chamber 88 defined by the housing 76 of fan assembly 68 has a cross-sectional scroll-like configuration. That is, a continuous inner chamber wall 90 defined by the housing 76 has an upstream curvilinear face 92 and a downstream curvilinear face 94. At the inlet opening 84, the upstream face 92 of the chamber wall 90 is disposed closely adjacent the periphery of fan 74. Chamber wall 90 increases in radial distance from the periphery of fan 74 as it leads to the downstream face 94. The downstream face 94 of chamber wall 90 extends rearwardly and upwardly toward the sieves 60, 62 for directing cleaning air exhausted from the fan 74 theretowards. This configuration of the housing chamber 88 is such that the air flow generated by the rotation of the fan 74 pushes upon itself in the area where the chamber wall 90 is arranged proximate to the periphery of the fan 74, thus adding pressure to the air flow generated by the fan 74 and directed upwardly toward the sieves 60, 62.

The housing 76 further includes an upper air directing baffle 96 extending between opposite sides of the combine and preferably formed from a material such as sheet metal that is impervious to the passage of air. As shown in FIG. 3, the upper air directing baffle 96 defines a leading edge 98 which is positioned closely adjacent the rear-most peripheral edge of the fan 74. Baffle 96 extends rearwardly and upwardly from its leading edge 98.

In the illustrated embodiment, baffle 96 includes first and second portions 100 and 102, respectively. The first portion 100 of baffle 98 extends substantially horizontally and rearwardly from the leading edge 98. The first portion 100 of baffle 96 extends rearwardly from the fan 74 and is vertically disposed closely adjacent to horizontal plane passing above but proximate to the rotational axis 82 of fan 74. The second portion 102 of baffle 96 leads rearwardly and upwardly at an acute angle to the horizontal and from the rear edge of the first portion of baffle 96 to direct air exhausted from the fan upwardly toward the sieves 60 and 62.

The off-highway machine illustrated further includes a transversely elongated shroud or sheet 104 angling downwardly and away from the pan 66 rearwardly of the fan assembly 68. The shroud or shield 104 extends between opposed sides of the combine 10 and is preferably formed from a material such as sheet steel or the like that is substantially impervious to air passing therethrough. To add strength and rigidity thereto, shroud 104 is preferably joined, toward its upper end to pan 66 and toward its lower end to the upwardly directed air baffle 96 of housing 76. The purpose of the shroud or sheet 104 is to direct materials gravitationally falling from the separating section 42 or from pan 66 and direct such materials toward the sieves 60, 62 while preventing such materials from passing into the open inlet 84 of the fan assembly 68. That is, the shroud or shield 104 is intended to prevent large or substantial quantities of crop materials such as grain and material other than grain from passing into the inlet 84 of the fan assembly 68.

According to the present invention, a precleaner apparatus 110 is arranged proximate to and in operable combination with the blower or fan assembly 68 of the off-highway machine 10. The precleaner apparatus 110 is essentially an elongated air plenum or structure 112 preferably of generally coequal measure to the length of the fan assembly 68. In the illustrated embodiment, the air plenum structure 112 has a generally triangular configuration with one corner of the air plenum 112 disposed vertically below the other two corners such that the plenum 112 has a vertically increasing cross-section measuring upwardly from the ground.

Figure 4:
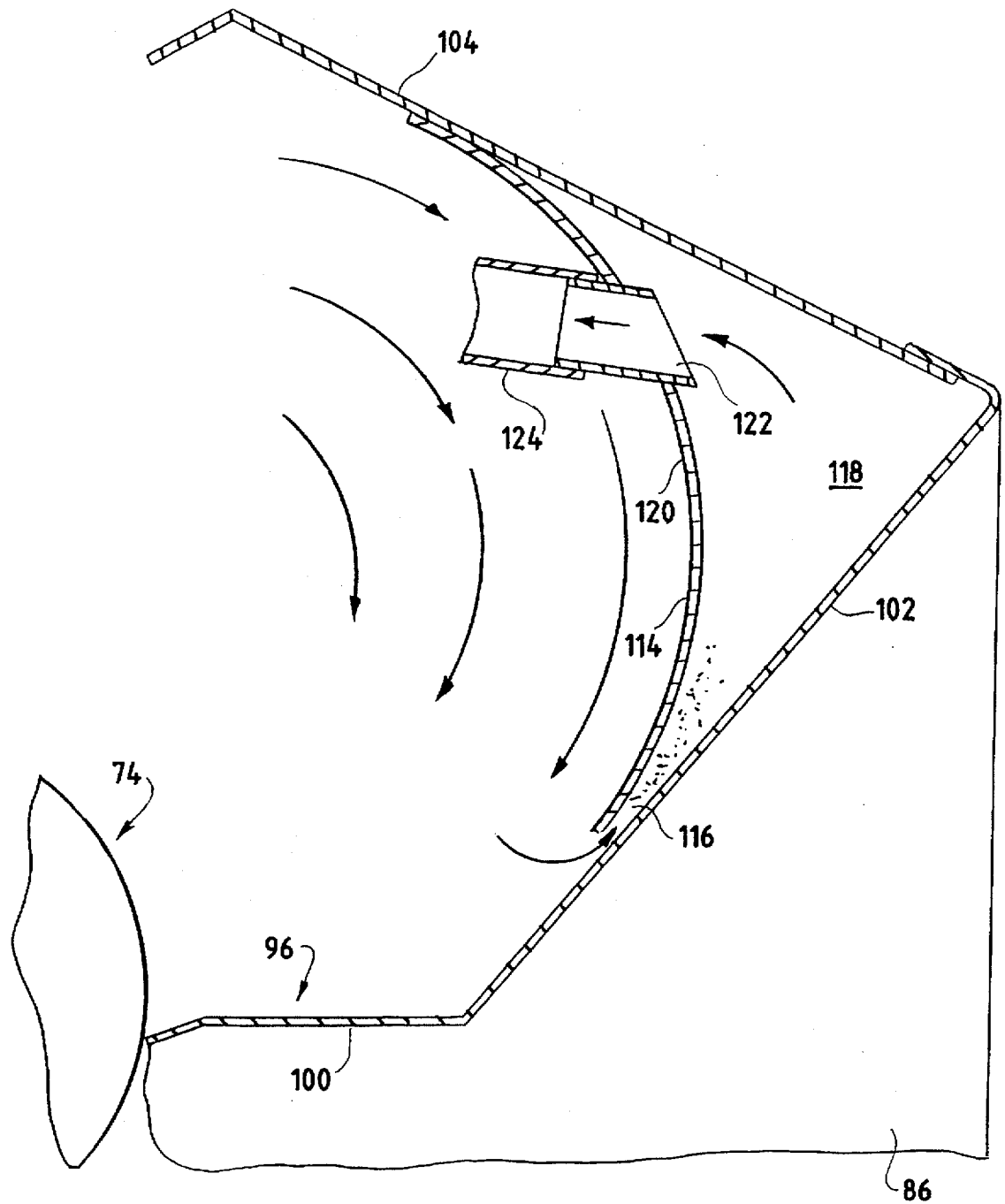
FIG. 4 is an enlarged sectional view of the air plenum of the present invention.

In the illustrated embodiment, and as shown in FIGS. 3 and 4, the air plenum structure 112 is defined in part by the upper air directing baffle 96 of housing 76, the shroud 104, and a rigid front plate 114 attached, toward one end, to the shroud 104 to define a chamber or cavity 118 closed at opposite lateral ends thereof. Turning to FIG. 4, a lower end of plate 114 is spaced a predetermined distance from the upper air directing baffle 96 of housing 76 to define an elongated inlet opening or aspirator 116 for allowing a relatively small or secondary stream of air into the chamber or cavity 118 defined by the air plenum structure 112. In the illustrated embodiment of the invention, the inlet opening 116 preferably extends the full length of the air plenum 112. The lower end of plate 114 is preferably spaced along its entire length from the air directing baffle 96 by a distance ranging between about 0.187 inches and about 0.625 inches. In a most preferred form of the invention, the lower end of the plate 114 is displaced along its entire length from the air directing baffle by a distance measuring about 0.250 inches.

Notably, the front plate 114 of the air plenum structure 112 has a relatively smooth outer surface 120 to promote movement of air and debris thereover. Testing has revealed configuring the outer surface 120 of plate 114 with a curvilinear configuration complementary to that of the periphery of the fan 74 of fan assembly 68 will advantageously cause the air and particulate matter entrained therewith to rapidly accelerate as they move over and along the outer surface 120 of plate 114.

The air plenum structure 112 further defines an outlet 122 for allowing precleaned air to pass from cavity 118 to the enclosure 20. As shown, the outlet 122 is elevationally disposed above the inlet opening 116 to the air chamber 118. A suitable conduit 124 serves to connect the outlet 122 of the precleaner apparatus 110 to the fan or blower 40 of the atmosphere control system 38.

Although the outlet 122 for the precleaner apparatus 110 is shown in the drawings as disposed in the front plate 114, it should be appreciated that the outlet 122 could equally be disposed in other areas such that the conduit 124 extending therefrom does not interfere with or inhibit the air flow passing along the front face 120 of the air plenum toward the fan assembly 68. For example, it is well within the spirit and scope of the present invention to define the outlet 122 for the precleaner apparatus 110 at either end thereof and with the conduit 124 extending between such outlet 122 and the atmosphere control system 38.

For several reasons, the air withdrawn from the cavity 118 of the precleaner apparatus 110 is relatively free from debris and other contaminants. First, since the air plenum 112 purposefully increases in cross-sectional area, measuring from the inlet 116, the air drawn into and moving upwardly within chamber 118 of structure 112 will decrease in velocity as it moves away from the inlet 116 thereby allowing gravity to naturally draw downwardly upon any particulate matter remaining in the air drawn into the cavity 118 of the air plenum structure 112. Second, the air stream drawn into the inlet 116 of structure 112 will have a significantly reduced velocity thereby inhibiting debris from moving upwardly into the chamber 118 of structure 112. That is, because the air drawn into the chamber 118 through inlet 116 effects a near reversal in flow, compared to the primary air stream directed toward the fan assembly 74, the air velocity of the secondary stream of air is significantly reduced thus reducing the likelihood that contaminants will flow into the cavity 118 of structure 112. Moreover, the narrowed cross sectional configuration of the inlet 116 will effect a substantial reduction in the velocity of air passing into the chamber 118. The relatively small velocity of air flow in the secondary stream of air passing through the inlet 116 and into the chamber 118 further explains the inability of dust, dirt and other debris to separate from the major or primary air flow passing toward the fan assembly 68 thereby allowing cleaner air to flow into the cavity 118 of the precleaner structure 112.

As will be appreciated, a suitable filter assembly 126 (FIG. 1) is preferably disposed between the outlet 122 and the fan or blower 40 of the atmosphere control system 38 to further promote cleaning of the air. In a most preferred form of the invention, such a filter assembly 126 is mounted to an exterior side wall 32 of the enclosure 20 thereby yielding ready access to the filter assembly and thus not limiting the sire thereof.

In operation, the precleaning function of apparatus 110 is effected by bleeding a relatively small stream of air from a rapidly moving stream of air already present and available somewhere on the off-highway machine. Testing has revealed that when bleeding a small amount of air out of a rapidly moving stream of air, the particulate matter in the larger, rapidly moving mass of air will tend to remain in the path it was traveling. Thus, removing an insignificant portion of the air in a direction radically different from the direction of major flow, will allow the extraction of only clean air from that rapidly moving stream of air.

With the present invention, the rotation of the cleaning fan 74 of fan assembly 68 creates a relatively rapid velocity of air to move over the outer face 116 of the air plenum structure 112. Configuring the outer face 116 of air plenum structure 112 with a curvilinear surface complementary to that of the periphery of fan 74 of fan assembly 68 furthermore enhances acceleration of the ambient air as it approaches the fan inlet opening 84. The particulate matter in the primary air stream drawn toward the fan inlet 84 is likewise accelerated as it follows the primary path of air flow toward the fan assembly 68. As the particulate matter approaches the inlet 84 to the fan 74 it becomes inescapably trapped by its own momentum caused by its mass and velocity and is therefore predisposed to enter the chamber 86 and be carried thereabout.

According to the present invention, a small or secondary air flow in the rapidly moving air flow is directed into the cavity 118 of the air plenum through the inlet opening 116.

Notably, the secondary flow of air bled into the air plenum cavity 118 turns about 180 degrees at the opening 116 and is pulled upwardly into the cavity 118.

As is conventional, the cab enclosure 20 is designed to "leak" at a specified rate requiring a make-up air flow sufficient to maintain the a quality in the enclosure 20 at an acceptable level. Normally, the pressurizing blower 40 of the atmosphere control system 38 runs continuously when the door 36 of the cab 20 is closed. When the pressurizing blower 40 of the atmosphere control system 38 is operating, air is drawn from cavity 118 toward the blower 40 through the conduit 124 thus creating a reduced pressure in the chamber 118 of the air plenum 112. As a result, a small or secondary stream of air is naturally drawn into the chamber 118 of plenum 112 through the inlet 116.

The abrupt change of direction of the secondary air flow bled into the cavity 118 of structure 112 serves to preclude matter with higher mass (momentum) from following this small or secondary flow of air. Since the walls of the air plenum 112 diverge outwardly as the air moves upwardly, the air drawn into the air chamber 118 tends to lose velocity as a function of its displacement relative to the inlet opening 116 thereby giving the particulate matter in the air drawn into the cavity 118 another reason to gravitationally fall toward the inlet opening 116.

As the precleaned air passes toward the enclosure 20, it is further filtered through the filter assembly 126. As will be appreciated, when the fan assembly 68 ceases operation, as when the machine is shut down, any material that has been drawn into the cavity 118 of the air plenum 112 would gravitationally fall from the outlet 116, thus serving a self-cleaning function.

Thus, the present invention offers a simple device for precleaning the air with mechanisms already present on most off-highway machines. Since the precleaning apparatus of the present invention has no moving parts, it is simple in operation and effective for long term use. Moreover, the present invention is readily adaptable to existing machines.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A self propelled off-highway machine having a mobile frame supported on ground engaging wheels, an enclosed cab having a plurality of walls joined by a floor and a roof, an elongated pressurized blower assembly for developing a stream directed toward an inlet thereof and directing a pressurized stream of air away therefrom, and an apparatus arranged proximate to and in operable combination with said blower assembly for providing precleaned air from a precleaned stream of air provided by the apparatus and diverted from said pressurized stream of air to said enclosed cab.

2. The self-propelled machine according to claim 1 wherein said apparatus for providing precleaned air to enclosure includes an air plenum having an inlet through which air enters and an outlet from precleaned air passes toward said enclosed cab.

3. The self-propelled machine according to claim 1 wherein the inlet of said air plenum is arranged relative to and upstream of said blower assembly.

4. The self-propelled machine according to claim 1 wherein said air plenum is of substantially coequal lengthwise measure with said blower assembly.

5. The self-propelled machine according to claim 2 wherein said blower comprises a fan rotatably arranged within a housing, and wherein a portion of said housing defines a portion of said air plenum.

6. The self-propelled machine according to claim 5 wherein said air plenum includes a smooth curvilinear surface configuration arranged relative to said fan to establish a directed relatively high velocity air flow toward said fan.

7. A self-propelled off-highway machine having a mobile frame, a cab enclosure carried on said frame and having a plurality of walls joined by a floor and roof, a centrifugal fan assembly for drawing air from outside the machine toward a center of the fan assembly and directing a pressurized stream of air away from the center of the fan assembly, and an apparatus for dividing the outside air drawn toward the fan and directing a first portion of that air toward the fan and a second precleaned portion of the air through an inlet and into a cavity defined by said apparatus from whence precleaned air is provided to said enclosure at a lower velocity than said pressurized stream of air to separate dust and debris away from said precleaned air, said apparatus functioning to concentrate and entrain dust and debris entrapped in the outside air in the first air portion thereby allowing precleaned air in the cavity to be directed toward the enclosure.

8. The self-propelled machine according to claim 7 further including a fan for establishing a pressure in said enclosure, said fan further serving to draw air from the cavity of said apparatus toward said enclosure.

9. The self-propelled machine according to claim 8 further including a filter disposed between said fan and the cavity of said enclosure for further cleaning the air passing therebetween.

10. The self-propelled machine according to claim 7 wherein said apparatus for providing precleaned air to enclosure includes an air plenum having an inlet through which air enters and an outlet from precleaned air passes toward said enclosure.

11. The self-propelled machine according to claim 7 wherein the inlet of said air plenum is arranged relative to and upstream of said fan assembly.

12. The self-propelled machine according to claim 7 wherein said air plenum is of substantially coequal lengthwise measure with said fan assembly.

13. The self-propelled machine according to claim 12 wherein said fan assembly comprises a fan rotatably arranged within a housing, and wherein a portion of said housing defines a portion of said air plenum.

14. The self-propelled machine according to claim 13 wherein said air plenum includes a smooth curvilinear surface configuration arrange relative to said fan assembly to establish a directed relatively high velocity air flow toward said fan assembly.

15. A self-propelled off-highway machine having a cab enclosure, a fan assembly for creating a directed flow of air, and a precleaner apparatus operated as a function of said fan assembly, said precleaning apparatus including an aspirator arranged and positioned relative to said fan assembly whereby a rapidly moving volume of air is drawn toward said fan assembly and wherein a small portion of the volume of air is redirected at a slower rate from the rapidly moving volume of air which causes entrained dirt and dust to be removed therefrom such that precleaned air derived from said redirected air portion is passed to said enclosure.

16. The self-propelled off-highway machine according to claim 15 wherein said fan assembly comprises an elongated fan rotatably mounted in a housing, said fan defining an elongated axis of rotation with a plurality of elongated fan blades extending in an axially cylindrical pattern about said axis.

17. The self-propelled off-highway machine according to claim 16 wherein said precleaner apparatus comprises an elongated air plenum extending generally parallel to the rotational axis of said fan, said air plenum including converging wall sections with said aspirator being defined by an opening at converging lower ends of two of said wall sections.

18. The self-propelled off-highway machine according to claim 17 wherein said air plenum defines an outlet positioned in elevated relation above said aspirator opening such that dirt and dust entrapped in said precleaned air gravitationally passes out of said aspirator opening.

19. The self-propelled off-highway machine according to claim 18 wherein said fan assembly and said precleaner apparatus are disposed remote from said enclosure, with a conduit extending from an exhaust outlet of said precleaner apparatus to said enclosure for conveying precleaned air therebetween.

20. The self-propelled off-highway machine according to claim 19 further including a filter assembly disposed between said precleaner apparatus and said enclosure for further cleaning the air passing into said enclosure.

21. The self-propelled off-highway machine according to claim 17 wherein said air plenum is of substantially equal length to that of said fan assembly.

22. The self-propelled off-highway machine according to claim 17 wherein said air plenum includes a relatively smooth curved outer surface configuration arranged relative to said fan assembly to establish a directed relatively high velocity air flow toward said fan assembly.

23. The self-propelled off-highway machine according to claim 15 further including a fan arranged within the cab enclosure for establishing a pressure higher than atmospheric pressure within said enclosure.

24. An agricultural combine including a mobile frame, a cab enclosure mounted toward a forward end of said frame, a grain separating section mounted on said frame and a grain cleaning section, said grain cleaning section including a sieve arranged in material receiving relation relative to said grain separating section and a fan assembly for directing a main flow from an air stream from beneath and through said sieve for separating grain from material other than grain, and an apparatus arranged proximate and in operable combination with the fan assembly of said cleaning section to divert a smaller flow from said air stream and reduce the flow rate in said smaller flow of said air stream to reduce dust and dirt and to provide precleaned air to said cab enclosure.

25. The agricultural combine according to claim 24 wherein said fan assembly comprises a fan including a series of axially elongated blades concentrically arranged in a cylindrical pattern about a longitudinal axis of the fan, and a housing in which said fan is rotatably mounted.

26. The agricultural combine according to claim 25 wherein said apparatus includes an elongated air plenum of substantially coequal length with said fan.

27. The agricultural combine according to claim 26 wherein said air plenum includes a front facing arcuate plate for directing air to an inlet of the housing for said fan assembly.

28. The agricultural combine according to claim 27 wherein said air plenum defines an inlet of substantially coequal length to said fan assembly and which is disposed, in the direction of air flow, closer to the inlet to said housing than is an outlet defined by said air plenum such that as the air approaches the air inlet to the housing of said fan assembly debris in the air is inescapably entrapped by the momentum of the air and the mass and velocity of such debris thereby predisposing said debris to enter the fan assembly rather than said precleaner apparatus.

29. The agricultural combine according to claim 24 further including a fan mounted in said cab enclosure for drawing precleaned air from said apparatus to said cab enclosure.

30. The agricultural combine according to claim 29 further including a an accessible filter disposed between said fan and said apparatus for further cleaning the air drawn toward said cab enclosure.

31. An agricultural combine including a mobile frame, a pressurized cab enclosure mounted toward a forward end of said frame, a grain separating section mounted on said frame and a grain cleaning section, said grain cleaning section including a sieve reciprocally mounted on said frame in material receiving relation relative to said grain separating section and a fan assembly including a transversely elongated centrifugal fan assembly for directing an air stream from beneath and through said sieve for separating grain from material other than grain, and an elongated structure arranged parallel to and in adjacent relationship with said fan assembly, said elongated structure defining an elongated cavity having a slit inlet for allowing a small portion of the air stream to be drawn thereinto at a reduced velocity then that of said air stream and for preventing dust and dirt from being drawn thereinto and an outlet from whence precleaned air is directed toward said enclosure.

32. The agricultural combine according to claim 31 wherein said fan assembly comprises a housing defining an elongated air inlet opening and an elongated outlet opening.

33. The agricultural combine according to claim 32 wherein said elongated structure comprises an elongated arcuate front plate for directing air in an accelerating path of travel toward the inlet opening of said fan assembly.

34. The agricultural combine according to claim 33 wherein a portion of the housing for said fan assembly defines a portion of said elongated structure.

35. The agricultural combine according to claim 31 further including a fan mounted inside of said enclosure for creating an pressurized air condition therewithin and for drawing precleaned air from said elongated structure toward said enclosure.

36. The agricultural combine according to claim 35 further including manually accessible filter disposed between said elongated structure and the fan mounted inside of said enclosure for further filtering the precleaned air presented to said enclosure.

* * * * *

UNITED STATES PATENT AND TRADEMARK OFFICE
CERTIFICATE OF CORRECTION

PATENT NO : 5,895,319
DATED : April 20, 1999
INVENTOR(S) : R. Matousek and R. Warnke It is certified that error appears in the above-identified patent and that said Letters Patent is hereby corrected as shown below:

```
Col. 1 ln. 26  delete "ruined" and insert therefore --required--
Col. 1, ln. 37 delete "Filter" and insert therefore --Filtering--
Col. 1, ln. 51 delete "a" and insert therefore --air--
Col. 2, ln. 2  delete "fall" and insert therefore --fail--
Col. 2, ln. 6  delete "a intake" and insert therefore -- air intake-
Col. 2, ln. 23 delete "pats" and insert therefore --parts
Col. 2, ln. 32 delete "arran ged" and insert therefore --arranged--
Col. 2, ln. 50 delete "g" and insert therefore --grain--
Col. 3. ln. 7  delete "defied" and insert therefore --defined--
Col. 4, ln. 47 delete "Into" and insert therefor --into--
Col. 6, ln. 1  delete "g" and insert therefor --grain--
Col. 7, ln. 6  delete "hike" and insert therefor --like--
Col. 9, ln. 12 delete "a quality" and insert therefor --airquality-
Col. 9, ln. 60 before "stream" insert --rapidly moving air--
```

Signed and Sealed this

Twenty-sixth Day of October, 1999

Q. TODD DICKINSON

Attest:

*Attesting Officer*    *Acting Commissioner of Patents and Trademarks*